(12) United States Patent
Fujii

(10) Patent No.: US 8,771,796 B2
(45) Date of Patent: Jul. 8, 2014

(54) COATING FILM FORMATION METHOD

(75) Inventor: Takeshi Fujii, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 4 days.

(21) Appl. No.: 13/819,833

(22) PCT Filed: Aug. 9, 2011

(86) PCT No.: PCT/JP2011/068167
§ 371 (c)(1),
(2), (4) Date: Feb. 28, 2013

(87) PCT Pub. No.: WO2012/032894
PCT Pub. Date: Mar. 15, 2012

(65) Prior Publication Data
US 2013/0157071 A1    Jun. 20, 2013

(30) Foreign Application Priority Data

Sep. 8, 2010  (JP) .................................. 2010-201455

(51) Int. Cl.
| | |
|---|---|
| *B05D 3/02* | (2006.01) |
| *C09D 151/06* | (2006.01) |
| *C09D 133/26* | (2006.01) |
| *B05D 7/00* | (2006.01) |
| *C08F 291/08* | (2006.01) |
| *B05D 3/10* | (2006.01) |
| *C08F 265/06* | (2006.01) |
| *C08F 291/12* | (2006.01) |
| *C08F 265/04* | (2006.01) |

(52) U.S. Cl.
CPC .............. *B05D 3/108* (2013.01); *C09D 151/06* (2013.01); *C09D 133/26* (2013.01); *B05D 7/532* (2013.01); *C08F 291/08* (2013.01); *B05D 3/0209* (2013.01); *C08F 265/06* (2013.01); *C08F 291/12* (2013.01); *C08F 265/04* (2013.01)
USPC ...................... 427/379; 427/385.5; 427/407.1

(58) Field of Classification Search
None
See application file for complete search history.

(56) References Cited

U.S. PATENT DOCUMENTS

| | | | |
|---|---|---|---|
| 2010/0204424 A1* | 8/2010 | Tamori et al. ................ | 526/264 |
| 2012/0022205 A1* | 1/2012 | Fujii ............................. | 524/531 |

FOREIGN PATENT DOCUMENTS

| | | |
|---|---|---|
| JP | 61-037312 | 8/1986 |
| JP | 2004/532331 | 10/2004 |
| JP | 2005-177632 | 7/2005 |
| JP | 2010-024262 | 2/2010 |
| WO | 02/094886 | 11/2002 |

OTHER PUBLICATIONS

International Search Report issued Nov. 15, 2011 in International (PCT) Application No. PCT/JP2011/068167.

* cited by examiner

*Primary Examiner* — Erma Cameron
(74) *Attorney, Agent, or Firm* — Wenderoth, Lind & Ponack, L.L.P.

(57) ABSTRACT

An object of the present invention is to provide a method for forming a coating film that is capable of forming a coating film having excellent smoothness, distinctness of image and luster using an aqueous coating composition. The present invention provides a method for forming a coating film comprising:

Step (1): forming an uncured coating film by applying to a substrate an aqueous coating composition that contains a copolymer of monomer components comprising one or more N-substituted (meth)acrylamide compounds, the copolymer being a graft copolymer comprising (A) a main chain having a lower critical solution temperature $T_1$ in water within the range of 30 to 95° C., and (B) at least one hydrophobic side chain;

Step (2): preheating the uncured coating film formed in Step (1) under heating conditions such that a preheating temperature $T_2$ falls within the range of 60 to 100° C., and the preheating temperature $T_2$ and the lower critical solution temperature $T_1$ have a relationship represented by the formula $T_2-T_1=-30$ to 30° C.; and Step (3): curing the uncured coating film formed in Step (2) by heating.

5 Claims, No Drawings

COATING FILM FORMATION METHOD

A CROSS REFERENCE OF RELATED APPLICATIONS

This application claims priority to Japanese Patent Application No. 2010-201455, filed on Sep. 8, 2010 (the entire contents of which are incorporated by reference herein).

The present invention relates to a method for forming a coating film.

TECHNICAL FIELD

Background Art

Hitherto, a method for forming a multilayer coating film by a 3-coat 2-bake (3C2B) process has been widely used for forming a coating film on automobile bodies. This method sequentially comprises the following steps of applying an electrodeposition coating composition to a substrate, applying an intermediate coating composition→curing by baking→applying an aqueous base coating composition→preliminary heating (preheating)→applying a clear coating composition→curing by heating.

However, in recent years, for the purpose of saving energy, consideration has been given to omitting the bake-curing step that is performed after applying the intermediate coating composition, and using a 3-coat 1-bake (3C1B) process sequentially comprising the following steps; applying an electrodeposition coating composition to a substrate→applying an aqueous intermediate coating composition→preliminary heating (preheating)→applying an aqueous base coating composition→preliminary heating (preheating)→applying a clear coating composition→curing by baking.

The preheating process performed in the 3-coat 2-bake process and 3-coat 1-bake process forcibly evaporates water that is contained in the aqueous intermediate coating composition or aqueous base coating composition as a solvent. The preheating process can prevent popping (pinholes) caused by explosive boiling of the moisture remaining in an aqueous intermediate coating composition or aqueous base coating composition in the curing by heating process.

Regarding the preheating process, for example, Patent Literature 1 discloses a preheating process comprising, after applying a water-based coating to an automobile body composition, a first flash-off step of blowing air with a relatively high temperature onto the automobile body; and a second flash-off step of blowing air with a temperature relatively lower than that of the first flash-off process onto the automobile body.

However, conventionally known preheating processes aimed to prevent popping and does not contribute to improve coating film smoothness, distinctness of image, and luster.

CITATION LIST

Patent Literature

PTL 1: JP2005-177632A

SUMMARY OF INVENTION

Technical Problem

An object of the present invention is to provide a method for forming a coating film with excellent smoothness, distinctness of image, and luster using an aqueous coating composition. Another object of the present invention is to provide an article coated by the coating film formation method.

Solution to Problem

The present inventors conducted extensive research and found that a coating film having excellent smoothness, distinctness of image, and luster can be forced by applying an aqueous coating composition containing a graft copolymer whose main chain has a specific lower critical solution temperature and whose side chain has hydrophobicity, followed by preheating at a specific temperature.

More specifically, the present invention provides the following coating film formation method and an article coated with the method.

Item 1. A method for forming a coating film comprising:

Step (1): forming an uncured coating film by applying to a substrate an aqueous coating composition that contains a copolymer of monomer components comprising one or more N-substituted (meth)acrylamide compounds, the copolymer being a graft copolymer comprising (A) a main chain having a lower critical solution temperature $T_1$ in water within the range of 30 to 95° C., and (B) at least one hydrophobic side chain;

Step (2): preheating the uncured coating film formed in Step (1) under heating conditions such that a preheating temperature $T_2$ falls within the range of 60 to 100° C., and the preheating temperature $T_2$ and the lower critical solution temperature $T_1$ have a relationship represented by the formula $T_2-T_1=-30$ to 30° C.; and Step (3): curing the uncured coating film formed in Step (2) by heating.

Item 2. The method for forming a coating film according to Item 1, which further comprises Step (2') between Step (2) and Step (3):

Step (2'): applying a clear coating composition to the uncured base coating film formed in Step (2) to form a clear coating film, the uncured base coating film and uncured clear coating film formed in Steps (2) and (2'), respectively, being simultaneously cured by heating in Step (3).

Item 3. The method for forming a coating film according to Item 1 or 2, wherein the graft copolymer is a copolymer obtained by radical copolymerization of an unsaturated monomer mixture containing said one or more N-substituted (meth)acrylamide compounds and a hydrophobic macromonomer.

Item 4. The method for forming a coating film according to Item 3, wherein the content of the N-substituted (meth)acrylamide compound is 1 to 99 parts by mass and the content of the hydrophobic macromonomer is 1 to 30 parts by mass relative to 100 parts by mass of unsaturated monomer mixture.

Item 5. An article comprising a coating film formed by the method for forming a coating film according to any one of Items 1 to 4.

Advantageous Effects of Invention

The coating method of the present invention makes it possible to obtain a coating film having excellent smoothness, distinctness of image, and luster.

DESCRIPTION OF EMBODIMENTS

Hereafter, the method for forming a coating film of the present invention is further described in detail, sequentially following each step.

Step (1)

In this step, an uncured coating film is formed by applying to a substrate an aqueous coating composition that contains a copolymer of monomer components comprising one or more N-substituted (meth)acrylamide compounds, the copolymer being a graft copolymer comprising (A) a main chain having a lower critical solution temperature $T_1$ in water of 30 to 95° C., and (B) at least one hydrophobic side chain.

Substrate

The substrate to be coated with the aqueous coating composition of the present invention is not particularly limited. Examples of substrates include exterior panel parts of automobile bodies, such as passenger cars, trucks, motorcycles, and buses; automotive components; exterior panel parts of home appliances, such as cellular phones and audio equipment; etc. Of these substrates, exterior panel parts of automobile bodies and automotive components are preferable.

The material for the substrate is not particularly limited. Examples thereof include metallic materials, such as iron, aluminum, brass, copper, tin, stainless steel, galvanized steel, steel plated with a zinc alloy (Zn—Al, Zn—Ni, Zn—Fe, etc.); plastic materials, such as polyethylene resins, polypropylene resins, acrylonitrile-butadiene-styrene (ABS) resins, polyamide resins, acrylic resins, vinylidene chloride resins, polycarbonate resins, polyurethane resins, epoxy resins and like resins, and various types of fiber-reinforced plastics (FRP); inorganic materials such as glass, cement, and concrete; wood; textile materials (e.g., paper and cloth); etc. Of these materials, metallic materials and plastic materials are preferable.

The substrate may be a metallic material listed above or one formed therefrom, such as a vehicle body, which is subjected to a surface treatment, such as a phosphate treatment, chromate treatment, or composite oxide treatment. The substrate may also be a metallic material, vehicle body, or the like as described above, on which an undercoating film of various electrodeposition coating compositions is further formed. The substrate may also have a coating film formed thereon by coating a base coating composition other than the aqueous coating composition containing the specific graft copolymer described above. Among these, vehicle bodies having an undercoating film formed thereon using a cationic deposition coating composition are particularly preferable.

Graft Copolymer

The graft copolymer used in the method of the present invention comprises a main chain that contains an N-substituted (meth)acrylamide compound as an essential monomer component, and has a lower critical solution temperature in water (hereafter, this may be simply referred to as "LCST") within a range of 30 to 95° C. The side chain of the graft copolymer used in the present invention is hydrophobic.

Such a main chain can be obtained by copolymerizing an N-substituted (meth)acrylamide compound with other unsaturated monomers, if necessary. The N-substituted (meth) acrylamide compound is a general term referring to N-alkylacrylamide, N-allylacrylamide, N-alkylmethacrylamide, N-allylmethacrylamide, N,N-dialkylacrylamide, N,N-diallylacrylamide, N-alkyl, N-allylacrylamide, N,N-dialkylmethacrylamide, N,N-diallylmethacrylamide, N-alkyl, N-allylmethacrylamide and derivatives thereof.

Specific examples of N-substituted (meth)acrylamide compounds include N-methylacrylamide, N-butoxymethylacrylamide, N-ethylacrylamide, N-n-propylacrylamide, N-isopropylacrylamide, N-cyclopropylacrylamide, N-hydroxyethylacrylamide, N-methylolacrylamide methyl ether, N-methylolacrylamide ethyl ether, N-methylolacrylamide propyl ether, N-methylolacrylamide butyl ether, acryloyl morpholine, diacetone acrylamide, N-methylmethacrylamide, N-butoxymethylmethacrylamide, N-ethylmethacrylamide, N-n-propylmethacrylamide, N-isopropylmethacrylamide, N-cyclopropylmethacrylamide, diacetone methacrylamide, N,N-dimethylacrylamide, N,N-diethylacrylamide, N-methyl, N-ethylacrylamide, N,N-dimethylmethacrylamide, N,N-diethylmethacrylamide, N,N-dimethylaminopropylacrylamide, and N-methyl, N-ethylmethacrylamide. These components may be used singly or in a combination of two or more.

Among these, the following are well known for the fact that their homopolymers indicate an LCST: N-isopropylacrylamide (LCST of 30.9° C.), N-n-propylacrylamide (LCST of 21.5° C.), N-n-propylmethacrylamide (LCST of 28.0° C.), N,N-diethylacrylamide (LCST of 32.0° C.) and the like (reference document: Shoji ITO, Kobunshi ronbunshu; Japanese Journal of Polymer Science and Technology 46(7), pp. 437-443 (1989))

In the present invention, by radically copolymerizing one or more N-substituted (meth)acrylamide compound with at least one other unsaturated monomer, if necessary, a main chain exhibiting an LCST of 30 to 95° C. can be synthesized. In this case, it is preferable that at least one monomer selected from N-isopropylacrylamide, N-n-propylacrylamide, N,N-dimethylacrylamide, N,N-diethylacrylamide, and N-hydroxyethylacrylamide, and more preferably, N-isopropylacrylamide, N,N-dimethylacrylamide, and N-hydroxyethylacrylamide be contained as the N-substituted (meth)acrylamide from the viewpoint of water solubility, etc.

In the present invention, any known radical polymerizable unsaturated monomers may be suitably used as at least one other monomer to be copolymerized with an N-substituted (meth)acrylamide, if necessary. Examples of monomers that contain one unsaturated group per molecule are as follows.

Examples of acryloyl monomers include methyl acrylate, ethyl acrylate, isopropyl acrylate, n-butyl acrylate, isobutyl acrylate, tert-butyl acrylate, 2-ethylhexyl acrylate, stearyl acrylate and like $C_{1-24}$ alkyl acrylates; acrylic acid; 2-hydroxyethyl acrylate and like hydroxyalkyl acrylates; glycidyl acrylate, 3,4-epoxycyclohexyl methylacrylate and like epoxy-containing acrylates; N,N-dimethylaminoethyl acrylate, N,N-diethylaminoethyl acrylate, N,N-dimethylaminopropyl methacrylate and like aminoalkyl acrylates; 3-ethyl-3-acryloyl oxymethyloxetane, 3-methyl-3-acryloyl oxymethyloxetane and like oxetane ring-containing acrylates.

Examples of methacryloyl monomers include methyl methacrylate, ethyl methacrylate, n-propyl methacrylate, isopropyl methacrylate, n-butyl methacrylate, isobutyl methacrylate, tert-butyl methacrylate, 2-ethylhexyl methacrylate, n-octyl methacrylate, lauryl methacrylate, tridecyl methacrylate, stearyl methacrylate and like $C_{1-24}$ alkyl methacrylates; methacrylic acid; 2-hydroxyethyl methacrylate, hydroxypropyl methacrylate, 4-hydroxybutyl methacrylate and like hydroxyalkyl methacrylates; glycidyl methacrylate, 3,4-epoxycyclohexyl methylmethacrylate and like epoxy-containing methacrylates; N,N-dimethylaminoethyl methacrylate, N,N-diethylaminoethyl methacrylate, N,N-dimethylaminopropyl methacrylate and like aminoalkyl methacrylates; 3-ethyl-3-methacryloyloxy methyloxetane, 3-methyl-3-methacryloyloxy methyloxetane, 3-butyl-3-methacryloyl oxymethyloxetane and like oxetane ring-containing methacrylates; γ-methacryloyl oxypropyltrimethoxysilane, β-methacryloyl oxyethyltrimethoxysilane and like alkoxysilyl-containing methacrylates; Silaplane FM-0711 (produced by Chisso Corporation) and like dimethyl polysiloxane-containing methacrylates; and hexafluoroisopropyl methacrylate, perfluorooctyl methyl methacrylate, perfluorooctyl ethyl methacrylate and like fluorine-containing methacrylates.

Examples of other radical polymerizable unsaturated monomers that contain one unsaturated group include acrylonitrile, methacrylonitrile, styrene, and vinyl toluene.

Examples of monomers that contain two or more unsaturated groups include ethylene glycol dimethacrylate, ethylene glycol diacrylate, 1,4-butanediol dimethacrylate, trimethylolpropane triacrylate, polyethylene glycol dimethacrylate, cyanuric acid triacrylate, triacrylformal and like (meth)acrylic-based, polyfunctional monomers; and triallylcyanurate, triallylisocyanurate, triallyltrimellitate, diethylene glycol diallyl ether and like allyl-based polyfunctional monomers. These monomers that contain two or more unsaturated groups cause the main chain of the graft polymer to branch and three-dimensionally gelate; therefore, a large amount of such monomers cannot be used. In the present invention, the amount of such monomers used is preferably 1% by mass or less relative to the total amount of monomers used in synthesizing the graft polymer, and more preferably such monomers are not used at all.

Method for Producing Graft Copolymer

The graft copolymer used in the present invention has at least one hydrophobic side chain. In the present invention, the side chain is the portion that is grafted to the main chain in the graft polymer.

One example of a method for obtaining such a graft polymer is to prepare the polymer that will become the main chain in advance by a known method, and then graft polymerize a hydrophobic monomer to the resulting polymer. Alternatively, a graft polymer can be synthesized in a single step by copolymerizing a hydrophobic macromonomer with other unsaturated monomers.

Among various methods, in order to readily obtain a target graft polymer, a method in which a hydrophobic macromonomer is copolymerised with at least one other unsaturated monomers is preferable. Methods for synthesizing a hydrophobic macromonomer preferably used in the present invention are described below.

There are various known methods for synthesizing a macromonomer. For example, JP S43-011224B discloses a method for preparing a macromonomer by introducing a carboxylic acid group to the end of a polymer chain using a chain transfer agent, such as mercaptopropionic acid, in the process for preparing the macromonomer, and then introducing an ethylenically unsaturated group by adding methacrylic glycidyl thereto. JP H06-023209B and JP H07-035411B disclose a method employing catalytic chain transfer polymerization (CCTP) using a cobalt complex. JP H07-002954A discloses a method for obtaining a graft copolymer in which 2,4-diphenyl-4-methyl-1-pentene is subjected to radical polymerization using an addition-fragmentation chain transfer agent to obtain a macromonomer, and then this macromonomer is copolymerized with other ethylenic unsaturated monomers.

There is another method for producing a macromonomer in which glycidyl methacrylate is added to polyester resin (preferably linear polyester resin) having a carboxy-containing group at the end through ring opening addition.

Among these methods, the one using a chain transfer agent such as mercaptopropionic acid may be problematic because it requires the use of a mercaptan-based chain transfer agent having a strong odor, the types of functional groups in the unsaturated monomers that can be used to produce the macromonomer are greatly limited, the process for obtaining a graft copolymer is complicated, and the like. Furthermore, in the method employing catalytic chain transfer polymerization using a cobalt complex, in order to prevent catalytic chain transfer polymerization between the macromonomer and other monomers when they are radically polymerized, it is necessary to remove the cobalt complex or to chemically eliminate its catalytic activity. In contrast, the method for producing a macromonomer using 2,4-diphenyl-4-methyl-1-pentene as an addition-fragmentation chain transfer agent and performing radical polymerization is preferable as there are few problems in its industrial use.

Examples of monomers that are usable as starting materials for the macromonomer include alkyl (meth)acrylate, hydroxyalkyl (meth)acrylate, and (meth)acrylic acid.

Examples of alkyl (meth)acrylates include alkyl (meth)acrylate having a $C_{1-24}$ alkyl group, and preferably a $C_{4-18}$ alkyl group, and more preferably alkylmethacrylate having a $C_{4-18}$ alkyl group. More specifically, n-butyl methacrylate, 2-ethylhexyl methacrylate, dodecyl methacrylate, tridecyl methacrylate and stearyl methacrylate.

When the starting material for the macromonomer contains alkyl (meth)acrylate, the content of alkyl (meth)acrylate is preferably within the range of 5 to 100% by mass, more preferably within the range of 30 to 95% by mass, and still more preferably within the range of 40 to 90% by mass relative to the total amount of the starting material for the macromonomer.

Examples of hydroxyalkyl (meth)acrylates include alkyl (meth)acrylate having a $C_{1-24}$ alkyl group, preferably a $C_{1-8}$ alkyl group, and alkyl (meth)acrylate having one or two, and preferably one hydroxy group. For example, 2-hydroxyethyl methacrylate is preferably used.

When the starting material for the macromonomer contains hydroxyalkyl (meth)acrylate, the content of the hydroxyalkyl (meth)acrylate is preferably within the range of 5 to 70% by mass, and more preferably within the range of 10 to 60% by mass relative to the total amount of the starting material for the macromonomer.

In the present invention, the macromonomer preferably has a weight average molecular weight of 1,500 or more, and preferably 2,000 to 20,000 in order to impart a satisfactory thickening effect to the graft polymer (an aqueous solution thereof) prepared using the macromonomer.

In the present invention, the proportions by mass of the N-substituted (meth)acrylamide compound, at least one other monomer, and macromonomer that constitute the graft copolymer, relative to the total solids amount thereof, are preferably in the following ranges.

N-substituted (meth)acrylamide compound: 1 to 99% by mass, preferably 50 to 97% by mass, and more preferably 60 to 95% by mass;

Other unsaturated monomer: 0 to 98% by mass, preferably 0 to 47% by mass, and more preferably 0 to 35% by mass;

Macromonomer: 1 to 30% by mass, more preferably 3 to 20% by mass, and still more preferably 5 to 15% by mass.

When the content of the macromonomer exceeds 30 parts by mass relative to the total solids amount, the amount of the hydrophobic component becomes excessive, and this may result in unsatisfactory water solubility for the graft polymer at ordinary temperatures. When the content of the macromonomer is less than one part by mass, the thickening effect at ordinary temperatures, which is believed to be attributable to the hydrophobic interaction between the coating component and the graft polymer, may become unsatisfactory when the macromonomer is mixed with an aqueous coating composition.

In terms of the ratio of the N-substituted (meth)acrylamide compound to at least one other monomer, the types and amounts of the monomers can be changed depending on the targeted LCST. However, an N-substituted (meth)acrylamide compound polymer exhibits a remarkable change in dissolution behavior in the vicinity of the LCST, but almost all of the other monomers exhibit a slow change or no change; therefore, in order to obtain the desired sharp thermal response of the present invention, the amount of the N-substituted (meth) acrylamide compound is preferably 50 parts by mass or more relative to the total amount.

The graft polymer may be produced by selecting a suitable method from various known radical polymerization methods, such as the bulk polymerization method, solution polymerization method, and emulsion polymerization method. Among these, the ordinary solution polymerization method is preferably employed because of its relatively simple polymerization.

Examples of usable polymerization initiators used in the above radical polymerization methods include cyclohexanone peroxide, 3,3,5-trimethylcyclohexanone peroxide, methylcyclohexanone peroxide, 1,1-bis(tert-butylperoxy)-3, 3,5-trimethylcyclohexane, 1,1-bis(tert-butylperoxy)cyclohexane, n-butyl-4,4-bis(tert-butylperoxy)valerate, cumenehydro peroxide, 2,5-dimethylhexane-2,5-dihydroperoxide, 1,3-bis(tert-butylperoxy-m-isopropyl)benzene, 2,5-dimethyl-2,5-di(tert-butylperoxy)hexane, diisopropylbenzene peroxide, tert-butylcumyl peroxide, decanoyl peroxide, lauroyl peroxide, benzoyl peroxide, 2,4-dichlorobenzoyl peroxide, bis(tert-butylcyclohexyl)peroxy dicarbonate, tert-butylperoxy benzoate, 2,5-dimethyl-2,5-di(benzoylperoxy) hexane and like peroxide-based polymerization initiators; and 2,2'-azobis(isobutyronitrile), 1,1-azobis(cyclohexane-1-carbonitrile), azocumene, 2,2'-azobis(2-methylbutyronitrile), 2,2'-azobis dimethylvaleronitrile, 4,4'-azobis(4-cyanovaleric acid), 2-(t-butylazo)-2-cyanopropane, 2,2'-azobis (2,4,4-trimethylpentane), 2,2'-azobis(2-methylpropane), dimethyl 2,2'-azobis(2-methylpropionate) and like azo-based polymerization initiators.

The amount of the radical polymerization initiator used is not particularly limited; however, the amount thereof is generally 0.1 to 20 parts by mass, and preferably 0.2 to 10 parts by mass relative to 100 parts by mass of the total monomer components.

Preferable media are those that do not easily cause a chain transfer into a solvent and that are aqueous organic solvents. Examples of such solvents include ethylene glycol monomethyl etheracetate, diethylene glycol monobutyl ether acetate and like ester-based solvents; methyl ethyl ketone, methyl isobutyl ketone, diisobutyl ketone, cyclohexanone and like ketone-based solvents; methanol, ethanol, isopropanol, n-butanol, sec-butanol, isobutanol and like alcohol-based solvents; and n-butyl ether, dioxane, ethylene glycol monomethyl ether, ethylene glycol monoethyl ether and like ether-based solvents. These organic solvents may be used singly or in a combination of two or more. During the radical polymerization, these organic solvents are used generally in an amount of 400% by mass or less relative to the total amount of the monomer components.

The weight average molecular weight of the graft polymer is preferably 20,000 or higher and more preferably 100,000 or higher to obtain the desired thickening property.

In the present invention, the weight average molecular weight of the graft polymer and the weight average molecular weight of the macromonomer are determined by measuring the retention time (retention volume) thereof using Gel Permeation Chromatography (GPC), and converting the values into those of polystyrene using the retention time (retention volume) of the standard polystyrene, whose molecular weight is known, measured under the same conditions.

The weight average molecular weight of the graft polymer can be measured using a gel permeation chromatography apparatus (HLC8120GPC, produced by Tosoh Corporation) together with one column (TSKgel GMHHR-L, produced by Tosoh Corporation), and a differential refractometer as a detector under the following conditions: mobile phase, N,N-dimethylformamide (containing 10 mM lithium bromide and 10 mM phosphate); measurement temperature, 25° C.; and flow rate, 1 mL/min.

The weight average molecular weight of the macromonomer can also be measured using a gel permeation chromatography apparatus (HLC8120GPC, produced by Tosoh Corporation) together with four columns (TSKgel G-4000 HXL, TSKgel G-3000 HXL, TSKgel G-2500 HXL, and TSKgel G-2000 HXL, produced by Tosoh Corporation), and a differential refractometer as a detector under the following conditions: mobile phase, tetrahydrofuran; measurement temperature, 40° C.; and flow rate, 1 mL/min.

The LCST of the main chain produced by copolymerization can be obtained by measurement. For convenience, the viscosity of a dilute aqueous solution of a single copolymer having a concentration of about 1 to 5% by mass is measured using a variable temperature-type viscometer. The measurement starts at room temperature and the viscosity is measured while increasing the temperature. The temperature at which the viscosity rapidly decreases, i.e., the peak temperature at the differential viscosity curve, can be determined as the lower critical solution temperature. As an even more convenient method, the transparency of the aqueous solution is visually observed while increasing the temperature, and the cloud point (the temperature at which the solution becomes cloudy due to polymer aggregation) is determined to be the lower critical solution temperature.

The present invention is characterized in that a graft polymer comprising a main chain having LCST and a hydrophobic side chain is used as a rheology modifier (thickener). Here, hydrophobic generally means the property of having low compatibility with water. In the present invention, hydrophobic means the state of being substantially insoluble in water at 20° C. As one example for determining hydrophobicity, a macromonomer is prepared separately from the main chain, and the macromonomer is determined to be hydrophobic when the mass of the macromonomer soluble in 100 g of water at 20° C. is 1 g or less.

In the case of an aqueous solution of a simple polymer that does not have a hydrophobic side chain and exhibits a LCST, the change in the viscosity of the solution in the vicinity of the LCST is not sufficient. In contrast, an aqueous solution of a graft polymer having the hydrophobic side chain of the present invention exhibits a sufficiently large change in viscosity in the vicinity of the LCST. The reason for this is not clear, but it is assumed that there is a special feature in its dissolving condition. Specifically, in an aqueous condition at a temperature equal to the LCST or lower, the graft polymer of the present invention exhibits hydrophobic interaction in its side chain with another side chain in the same graft polymer or with a side chain in another graft polymer; therefore, the polymers interactively form a network-like structure in the solution. As a result, the solution has a high viscosity at a temperature equal to or less than the LCST (exhibiting a greater thickening effect).

In this case, because a macromonomer is used as a comonomer, in order to more accurately measure the LCST of the main chain, it is preferable that a "polymer consisting only of a main chain" be measured to determine the LCST.

This effect becomes more remarkable when it synergistically increases the hydrophobic interaction with the binder used in a coating composition. For this reason, the effect becomes more remarkable when the binder contained in the aqueous coating composition is a water-dispersible resin having a hydrophobic portion rather than a water-soluble resin.

Aqueous Coating Composition

The aqueous coating composition coated in Step (1) contains the above-mentioned graft copolymer. The aqueous coating composition usually comprises, in addition to the graft copolymer, a thermosetting resin component and water. The aqueous coating composition may further comprise, if necessary, an effect pigment, a color pigment, an extender pigment, an organic solvent, a surface control agent, an antisettling agent, a UV absorber, a photostabilizer, a pigment dispersant, an antifoaming agent and the like. In the present specification, an aqueous coating composition is a coating composition whose principal solvent component is water.

As the above-mentioned thermosetting resin component, a base resin having a crosslinkable functional group and a cross linking agent can be used.

Examples of the crosslinkable functional group contained in the base resin include carboxy group, hydroxy group and epoxy group. Examples of base resins include acrylic resin, polyester resin, alkyd resin, and polyurethane resin. Examples of cross-linking agents include melamine resin, a polyisocyanate compound, and a blocked polyisocyanate compound.

The content of the graft copolymer in the aqueous coating composition is, on a solids basis, generally about 0.05 to 20 parts by mass, preferably about 0.1 to 10 parts by mass, and more preferably about 0.5 to 5 parts by mass relative to 100 parts by mass of the thermosetting resin component.

Examples of effect pigment include aluminum (such as vapor-deposited aluminum), copper, zinc, brass, nickel, glass flake, aluminium oxide, mica, and titanium oxide- and/or iron oxide-coated aluminum oxide, and titanium oxide- and/or iron oxide-coated mica. These effect pigments can be used singly, or in a combination of two or more. These effect pigments are preferably in the form of flakes.

As effect pigments in the form of flakes, pigments having a longitudinal dimension of about 1 to 100 μm, particularly about 5 to 40 μm, and a thickness of about 0.001 to 5 μm, particularly about 0.01 to 2 μm, are suitable.

When the aqueous coating composition contains the effect pigment, the content of the effect pigment is preferably about 1 to 100 parts by mass, more preferably about 2 to 50 parts by mass, and still more preferably about 3 to 30 parts by mass relative to 100 parts by mass of the thermosetting resin component on a solids basis.

With regard to the method for forming a coating film of the present invention, when the aqueous coating composition comprises the effect pigment, a coating film having excellent luster can be formed. Generally, a coating film with excellent luster is one in which brightness changes over a wide range depending on the angle at which the coating film is viewed, and in which the effect pigment in the coating film is relatively uniform, thus producing hardly any metallic mottling. Coating films that exhibit large brightness changes depending on the viewing angle are generally said to have a high flip-flop property.

In Step (1), the aqueous coating composition is applied in such an amount that the cured film thickness becomes usually about 1 to 50 μm, preferably about 5 to 35 μm, and more preferably about 8 to 25 μm.

The aqueous coating composition can be applied by known methods, such as air spray coating, airless spray coating, and rotary atomization coating.

Step (2)

The uncured coating film formed in Step (1) is preheated under heating conditions such that a preheating temperature $T_2$ falls within the range of 60 to 100° C. and the preheating temperature $T_2$ and the lower critical solution temperature $T_1$ have a relationship represented by the formula $T_2-T_1=-30$ to 30° C., preferably within the range of −20 to 20° C., and still more preferably within the range of −10 to 10° C.

In the present specification, the preheating temperature $T_2$ is a temperature in a preheating apparatus. The temperature may vary even in a preheating apparatus depending on the distance from the heat source. However, in a preheating apparatus, the temperature of the air is usually made uniform by circulating the air in the apparatus. Therefore, the preheating temperature $T_2$ can be defined as the temperature of the air in the preheating apparatus.

Preheating is preferably performed for about 1 to 15 minutes, more preferably about 2 to 10 minutes, and still more preferably about 3 to 5 minutes.

The preheating can be performed by a usual method for preheating coating films, such as air-blowing, infrared heating, or high-frequency heating. Examples of specific methods include one in which a substrate having an aqueous coating composition coated thereon is placed in a preheating furnace set at 60 to 100° C., and kept there for 1 to 15 minutes. In another method, a tunnel-type dryer having an entrance and an exit at either end through which the substrate is conveyed on a belt conveyor to perform preheating is prepared, wherein the temperature inside the tunnel is set to 60 to 100° C. and the substrate is passed through the tunnel, for example, for a period of 1 to 15 minutes.

Step (3)

The uncured coating film formed in Steps (1) and (2) described above is cured by heating.

The uncured coating film can be formed into a cured coating film by heating using a usual means for heating a coating film, such as air-blowing, infrared heating, or high-frequency heating and heating at 80 to 180° C., preferably 100 to 160° C., and more preferably 110 to 150° C. for about 10 to 40 minutes, and preferably about 15 to 30 minutes.

Application Examples of the Method for Forming a Coating Film of the Present Invention The above-described method for forming a coating film of the present invention also includes a method comprising a step of applying a clear coating composition between Step (2) of preheating the base coating composition and Step (3) of heat-curing. Specifically, the method for forming a coating film of the present invention can be suitably used for forming a multilayer coating film consisting of a base coating film and a clear coating film on automobile bodies or other substrates by a 2-coat 1-bake method. In this case, the method for forming a coating film can be performed in accordance with Method 1 below.

Method 1

A method for forming a coating film comprising:

Step (I): forming a base coating film by applying to a substrate an aqueous coating composition that contains a copolymer of monomer components comprising one or more N-substituted (meth)acrylamide compounds, the copolymer being a graft copolymer comprising (A) a main chain having a lower critical solution temperature $T_1$ in water within the range of 30 to 95° C., and (B) at least one hydrophobic side chain;

Step (II): preheating the uncured base coating film formed in Step (I) under heating conditions such that a preheating temperature $T_2$ falls within the range of 60 to 100° C., and the preheating temperature $T_2$ and the lower critical solution temperature $T_1$ have a relationship represented by the formula $T_2-T_1=-30$ to 30° C.;

Step (III): applying a clear coating composition to the uncured base coating film formed in Step (II) to form a clear coating film; and Step (IV): simultaneously curing the uncured base coating film and uncured clear coating film formed in Steps (I) to (III) by heating.

The substrate in Method 1 is preferably an automobile body having an undercoating film formed thereon, an automobile body having an undercoating film and an intermediate coating film formed thereon, or the like. The above-mentioned undercoating film is preferably formed by using an electrodeposition coating composition, and more preferably by using a cationic electrodeposition coating composition.

In the present invention, the cured coating film refers to a film in a dry-hard condition according to JIS K 5600-1-1 (2004), i.e., a condition in which imprints due to fingerprints are not formed on the coated surface and no movement is detected on the coating film when the center of the coated surface is strongly pinched with a thumb and an index finger, and in which scrapes are unobservable on the coated surface when the center of the coated surface is rubbed rapidly and repeatedly with a fingertip. The uncured coating film refers to a film that has not yet reached a dry-hard condition, including a film in a set-to-touch condition and a film in a dry-to-touch condition according to JIS K 5600-1-1.

When the method for forming a coating film of the present invention is performed by the 2-coat 1-bake method of Method 1, the thickness (cured film thickness) of the coating film of the aqueous coating composition is preferably about 3 to 30 μm, more preferably about 5 to 25 μm, and still more preferably about 8 to 18 μm. The thickness (the cured film thickness) of the coating film of the clear coating composition is preferably about 10 to 80 μm, more preferably about 15 to 60 μm, and still more preferably about 20 to 45 μm.

In Method 1, after application of the clear coating composition, it is possible to have an interval of about 1 to 60 minutes at ordinary temperature, or to perform preheating at about 40 to 80° C. for about 1 to 60 minutes, if necessary.

The aqueous coating composition and clear coating composition can be cured by using the above-described known heating means. The heating temperature is preferably about 80 to 180° C., more preferably about 100 to 170° C., and still more preferably about 120 to 160° C. The heating time is preferably about 10 to 60 minutes, and more preferably about 20 to 40 minutes. Both coating films, i.e., the base coating film and clear coating film, can be simultaneously cured by such heating.

As described above, the substrate that is used in the method for forming a coating film of the present invention also includes those to which a coating composition other than an aqueous coating composition containing the specific graft copolymer has previously been applied. Specifically, the method for forming a coating film of the present invention can be suitably used for forming a multilayer coating film consisting of a first coloring coating film, a second coloring coating film, and a clear coating film on automobile bodies or other substrates by a 3-coat 1-bake method, by using an aqueous coating composition containing the specific graft copolymer as a composition for forming the second coloring coating film. In this case, the method for forming a coating film can be performed in accordance with the following Method 2.

Method 2

A method for forming a coating film comprising:

Step (I): forming a first coloring coating film by applying a first coloring coating composition to a substrate;

Step (II): forming a second coloring coating film by applying to the uncured first coloring coating film an aqueous coating composition that contains a copolymer of monomer components comprising one or more N-substituted (meth) acrylamide compounds, the copolymer being a graft copolymer comprising (A) a main chain having a lower critical solution temperature $T_1$ in water within the range of 30 to 95° C., and (B) at least one hydrophobic side chain;

Step (III): preheating the uncured second coloring coating film formed in Step (II) under heating conditions such that a preheating temperature $T_2$ falls within the range of 60 to 100° C., and the preheating temperature $T_2$ and the lower critical solution temperature $T_1$ have a relationship represented by the formula $T_2-T_1=-30$ to 30° C.;

Step (IV): applying a clear coating composition to the uncured second coloring coating film formed in Step (III) to form a clear coating film; and Step (V): simultaneously heat-curing the uncured first coloring coating film, uncured second coloring coating film, and uncured clear coating film formed in Steps (I) to (IV).

The substrate in Method 2 is preferably, for example, an automobile body having an undercoating film formed thereon. The above-mentioned undercoating film is preferably formed by using an electrodeposition coating composition, and more preferably by using a cationic electrodeposition coating composition.

In Method 2, the thickness (cured film thickness) of the coating film of the first coloring coating composition is generally preferably about 3 to 50 μm, more preferably about 5 to 30 μm, and still more preferably about 10 to 25 μm. The thickness (cured film thickness) of the coating film of the aqueous coating composition containing the specific graft copolymer is preferably about 1 to 30 μm, more preferably about 3 to 25 μm, and still more preferably about 5 to 20 μm. The thickness (cured film thickness) of the coating film of the clear coating composition is generally preferably about 10 to 80 μm, more preferably about 15 to 60 μm, and still more preferably about 20 to 45 μm.

The above described method for forming a coating film of the present invention also includes a method comprising, between Step (2) of preheating the base coating composition and Step (3) of heat-curing, a step of applying a coating composition other than an aqueous coating composition containing the specific graft copolymer and a step of applying a clear coating composition. Specifically, the method for forming a coating film of the present invention can be suitably used for forming a multilayer coating film consisting of a first coloring coating film, second coloring coating film, and clear coating film on automobile bodies or other substrates by a 3-coat 1-bake method, by using an aqueous coating composition containing the specific graft copolymer as a composition for forming the first coloring coating film. In this case, the method for forming a coating film can be performed in accordance with Method 3 below.

Method 3

A method for forming a coating film comprising:

Step (I): forming a first coloring coating film by applying to a substrate an aqueous coating composition that contains a copolymer of monomer components comprising one or more N-substituted (meth)acrylamide compounds, the copolymer being a graft copolymer comprising (A) a main chain having a lower critical solution temperature $T_1$ in water within the range of 30 to 95° C., and (B) at least one hydrophobic side chain;

Step (II): preheating the uncured first coloring coating film formed in Step (I) under heating conditions such that a preheating temperature $T_2$ falls within the range of 60 to 100° C., and the preheating temperature $T_2$ and the lower critical solution temperature $T_1$ have a relationship represented by the formula $T_2-T_1=-30$ to 30° C.;

Step (III): applying a second coloring coating composition to the uncured first coloring coating film formed in Step (II) to form a second coloring coating film;

Step (IV): applying a clear coating composition to the uncured second coloring coating film formed in Step (III) to form a clear coating film; and Step (V): simultaneously heat-curing the uncured first coloring coating film, uncured second coloring coating film, and uncured clear coating film formed in Steps (I) to (IV).

The substrate in Method 3 is preferably, for example, an automobile body having an undercoating film formed thereon. The above-mentioned undercoating film is preferably formed by using an electrodeposition coating composition, and more preferably by using a cationic electrodeposition coating composition.

In Method 3, the thickness (cured film thickness) of the coating film of the aqueous coating composition containing the specific graft copolymer is generally preferably about 3 to 50 μm, more preferably about 5 to 30 μm, and still more preferably about 10 to 25 μm. The thickness (cured film thickness) of the coating film of the second coloring coating composition is preferably about 1 to 30 μm, more preferably about 3 to 25 μm, and still more preferably about 5 to 20 μm. The thickness (cured film thickness) of the coating film of the clear coating composition is generally preferably about 10 to 80 μm, more preferably about 15 to 60 μm, and still more preferably about 20 to 45 μm.

In Methods 2 and 3, after application of the clear coating composition, it is possible to have an interval of about 1 to 60 minutes at ordinary temperature, or to perform preheating at about 40 to 80° C. for about 1 to 60 minutes, if necessary.

In Methods 2 and 3, the three-layered coating films, i.e., the uncured first coloring coating film, uncured second coloring coating film, and uncured clear coating film, can be heat-cured by the above-described known heating means. The heating temperature is preferably about 80 to 180° C., more preferably about 100 to 170° C., and still more preferably about 120 to 160° C. The heating time is preferably about 10 to 60 minutes, and more preferably about 20 to 40 minutes. The three-layered coating films, i.e., the first coloring coating film, second coloring coating film, and clear coating film, can be simultaneously cured by such heating.

Any thermosetting clear coating composition known as a composition for coating automobile bodies and the like can be used as the clear coating composition used in Methods 1 to 3. Examples thereof include a crosslinkable functional group-containing base resin; organic solvent-type thermosetting coating compositions, aqueous thermosetting coating compositions, powder thermosetting coating compositions, etc., which contain a crosslinking agent; and the like.

Examples of crosslinkable functional groups contained in the base resin include carboxy, hydroxy, epoxy, silanol, and the like. Types of base resins include, for example, acrylic resins, polyester resins, alkyd resins, urethane resins, epoxy resins, fluorine resins, and the like. Examples of crosslinking agents include polyisocyanate compounds, blocked polyisocyanate compounds, melamine resins, urea resins, carboxy-containing compounds, carboxy-containing resins, epoxy-containing resins, epoxy-containing compounds, and the like.

Preferable combinations of the base resin/crosslinking agent in the clear coating composition include a carboxy-containing resin/epoxy-containing resin, a hydroxy-containing resin/polyisocyanate compound, a hydroxy-containing resin/blocked polyisocyanate compound, a hydroxy-containing resin/melamine resin, and the like.

The clear coating composition may be a one-component coating composition, or a multiple-component coating composition, such as a two-component urethane resin coating composition.

The clear coating composition may contain a coloring pigment, an effect pigment, a dye, etc., if necessary, as long as the transparency is not impaired. The clear coating composition may further suitably contain an extender pigment, an UV absorber, a light stabilizer, an antifoaming agent, a thickening agent, an anticorrosive, a surface control agent, and the like.

As the first coloring coating composition used in Method 2, a known thermosetting intermediate coating composition, for example, can be used. As the second coloring coating composition used in Method 3, a known thermosetting base coating composition, for example, can be used. Specifically, as such coating compositions, for example, a thermosetting coating composition containing a crosslinkable functional group-containing base resin, crosslinking agent, coloring pigment, and extender pigment may be suitably used.

Examples of crosslinkable functional groups present in the base resin include carboxy, hydroxy, epoxy, and the like. Types of base resins include, for example, acrylic resins, polyester resins, alkyd resins, urethane resins, and the like. Examples of crosslinking agents include melamine resins, polyisocyanate compounds, blocked polyisocyanate compounds, and the like.

Any one from among organic solvent-type coating compositions, aqueous coating compositions, and powder coating compositions may be used as the first coloring coating composition and the second coloring coating composition. Among these, an aqueous coating composition is preferably used.

In Methods 1 to 3, the first coloring coating composition, the second coloring coating composition, and the clear coating composition can be applied by any known method. Examples of such methods include air spray coating, airless spray coating, rotary atomization coating, and the like.

According to the method for forming a coating film of the present invention, a coating film excellent in smoothness, distinctness of image (DOI), and luster is formed. The reason for this is assumed to be as follows:

When an aqueous coating composition containing the graft polymer is applied to a substrate, a network structure is formed due to the hydrophobic side chains in the graft polymer, and viscosity is developed, inhibiting the occurrence of sagging. Thereafter, when preheating is performed under heating conditions in which a preheating temperature $T_2$ falls within the range of 60 to 100° C., and the preheating temperature $T_2$ and the lower critical solution temperature $T_1$ have a relationship represented by the formula $T_2-T_1=-30$ to 30° C., i.e., under heating conditions in which $T_2$ and $T_1$ are relatively close, the viscosity of the applied coating composition increases as the moisture evaporates, and the network structure of the graft polymer undergoes disruption in a relatively slow manner; as a result, the viscosity increases while the flowability sufficient to prevent sagging of the applied coating composition is maintained.

EXAMPLES

Hereinafter, the present invention is described in further detail with reference to Production Examples, Examples, and Comparative Examples. However, the present invention is not limited thereto. In the following examples, "part(s)" and "%" are based on mass unless otherwise specified. The film thickness of a coating film is on a cured basis.

Synthesis of Macromonomer Forming Hydrophobic Side Chains Production Example 1

83 parts of ethylene glycol monobutyl ether and 37 parts of butyl acetate were placed into a reaction vessel equipped with a thermometer, a thermostat, a stirrer, a reflux condenser, a nitrogen gas inlet tube, and a dropping funnel. The mixture was stirred at 90° C. while nitrogen gas was blown into the gas phase of the vessel, and a mixture comprising 50 parts of n-butyl methacrylate, 50 parts of 2-hydroxyethyl methacrylate, 8 parts of mercaptopropionic acid, and 1.8 parts of 2,2'-azobisisobutyronitrile was added thereto dropwise at a fixed rate over a period of 4 hours to perform a polymerization reaction. Subsequently, the mixture was aged at the same temperature for 2 hours, and then heated at 110° C. for 1 hour to obtain a prepolymer solution with a solids content of 47%. The obtained prepolymer had an acid value of 39.2 mg KOH/g on a solids basis. Then, 0.04 parts of hydroquinone monomethyl ether as a polymerization inhibitor and 11 parts of glycidyl methacrylate were added thereto. Thereafter, 3 parts of tetrabutylammonium bromide was further added thereto and allowed to react at 110° C. for 12 hours. Then, ethyl acetate was removed therefrom under reduced pressure, thereby obtaining a macromonomer solution (MM-1) with a solids content of 65%. The reaction rate of the glycidyl group of glycidyl methacrylate in this reaction was 96%. The obtained macromonomer had an average of about 1.0 polymerizable double bond per molecule. The obtained macromonomer was mainly composed of a methacrylate-terminated macromonomer, and had a weight average molecular weight of 4,000.

Production Example 2

The methacrylic acid ester and solvent to be used were both degassed (deoxidized) before use by feeding nitrogen gas thereinto for at least 1 hour.

30 parts of xylene and 25 parts of ethyl acetate were placed into a reaction vessel equipped with a thermometer, a thermostat, a stirrer, a reflux condenser, a nitrogen gas inlet tube, and a dropping funnel. The resulting liquid mixture was heated to 105° C. while nitrogen gas was fed into the liquid, and a mixture comprising 50 parts of n-butyl methacrylate, 50 parts of 2-hydroxyethyl methacrylate, 0.008 parts of bis(boron difluorodimethylglyoximate) cobalt (II) as a metal complex, 1 part of 2,2'-azobis(2-methylbutyronitrile) as a radical initiator, and 15 parts of ethyl acetate as an entrainer was added thereto dropwise over a period of 3 hours. After completion of the dropwise addition, the mixture was allowed to stand at 105° C. for 1 hour, and 0.5 parts of 2,2'-azobis(2-methylbutyronitrile) and 12 parts of xylene were added thereto dropwise over a period of 1 hour. After completion of the dropwise addition, the mixture was allowed to stand at 105° C. for 1 hour to thereby obtain a macromonomer solution with a solids content of 55%.

Xylene and ethyl acetate were removed from the obtained oligomer solution under reduced pressure to adjust the solids content thereof to 98% or more, and the resulting mixture was diluted with ethylene glycol monobutyl ether to thereby obtain a macromonomer solution (MM-2) with a solids content of 65%. The obtained macromonomer had an average of about 1.0 polymerizable double bond per molecule, was mainly composed of a methacrylate-terminated macromonomer, and had a weight average molecular weight of 4,000.

Production Example 3

16 parts of ethylene glycol monobutyl ether and 4.5 parts of 2,4-diphenyl-4-methyl-1-pentene (hereinafter sometimes abbreviated as "MSD") were placed into a reaction vessel equipped with a thermometer, a thermostat, a stirrer, a reflux condenser, a nitrogen gas inlet tube, and a dropping funnel. The mixture was stirred while nitrogen was blown thereinto at 160° C. Subsequently, a mixed solution comprising 50 parts of n-butyl methacrylate, 50 parts of 2-hydroxyethyl methacrylate, and 7 parts of di-tert-amyl peroxide was added thereto dropwise over a period of 3 hours and the mixture was then directly subjected to stirring for 2 hours. Thereafter, the resulting mixture was cooled to 30° C., and diluted with ethylene glycol monobutyl ether to obtain a macromonomer solution (MM-3) with a solids content of 65%. The obtained macromonomer had a weight average molecular weight of 4,000. According to an analysis by proton NMR, 97% or more of the ethylene unsaturated groups derived from MSD were located at the ends of the polymer chain, and 2% thereof disappeared.

Note that the above-described analysis by proton NMR was carried out in the following manner. Using heavy chloroform as a solvent, the following peaks before and after the polymerization reaction were measured: peaks based on protons of unsaturated groups in MSD (4.8 ppm, 5.1 ppm); peaks based on protons of ethylene unsaturated groups at the ends of a macromonomer chain (5.0 ppm, 5.2 ppm); and a peak of aromatic protons derived from MSD (7.2 ppm). The aromatic protons derived from MSD (7.2 ppm) was assumed to stay the same before and after the polymerization reaction. Based on the above, each unsaturated group (unreacted, macromonomer chain end, disappeared) was quantified.

Production Example 4

A macromonomer solution (MM-4) having a solids content of 65% was obtained as in Production Example 3, except that the monomer composition shown in Table 1 was used.

TABLE 1

| | Production Example | | | |
|---|---|---|---|---|
| | 1 | 2 | 3 | 4 |
| Name of Macromonomer | MM-1 | MM-2 | MM-3 | MM-4 |
| n-Butyl methacrylate | 50 | 50 | 50 | |
| 2-Hydroxyethyl methacrylate | 50 | 50 | 50 | 80 |
| Methacrylic acid | | | | 20 |
| Mercaptopropionic acid | 8 | | | |
| Glycidyl methacrylate | 11 | | | |
| Cobalt complex | | 0.008 | | |
| 2,4-Diphenyl-4-methyl-1-pentene | | | 4.5 | 5.3 |

TABLE 1-continued

|  | Production Example | | | |
|---|---|---|---|---|
|  | 1 | 2 | 3 | 4 |
| 2,2'-Azobisisobutyronitrile | 1.8 | | | |
| 2,2'-Azobis(2-methylbutyronitrile) | | 1 | | |
| di-tert-amyl peroxide | | | 7 | 7.8 |
| Weight Average Molecular Weight | 4,000 | 4,000 | 4,000 | 4,000 |

1 g of the above MM-1, MM-2, or MM-3 does not dissolve in 100 g of water at 20° C.; however, 1 g or more of the above MM-4 dissolves in 100 g of water at 20° C.

Production Example 5

40 parts of ethylene glycol monobutyl ether was placed into a reaction vessel equipped with a thermometer, a thermostat, a stirrer, a reflux condenser, and a dropping funnel, and heated to 60° C. while nitrogen gas was blown into the liquid. Thereafter, each of a mixture comprising 16 parts of N,N-dimethylacrylamide, 84 parts of N-isopropylacrylamide, and 80 parts of ethylene glycol monobutyl ether, and a mixture comprising 0.15 parts of 2,2'-azobis(2,4-dimethylvaleronitrile) and 24 parts of methylethylketone was added dropwise to the flask over a period of 4 hours. After completion of the dropwise addition, the resulting mixture was aged for 1 hour. Subsequently, a mixture comprising 0.15 parts of 2,2'-azobis(2,4-dimethylvaleronitrile) and 6 parts of methylethylketone was added dropwise to the flask over a period of 1 hour. After completion of the dropwise addition, the mixture was aged for 1 hour and then cooled to obtain a polymer solution with a solids content of 40%. The obtained polymer solution was precipitated in diethyl ether, and the precipitate was dried under reduced pressure to thereby obtain a copolymer (P-1) with a solids content of 99% or higher. The lower critical solution temperature $T_1$ of this copolymer as a 1% aqueous solution measured by the cloud point method was 34° C.

Production Examples 6 to 14

Copolymers (P-2) to (P-10) were obtained as in Production Example 5, except that the monomer compositions shown in Table 2 were used. Table 2 also shows the lower critical solution temperatures of the obtained copolymers measured by the cloud point method.

Production Example 15

15.4 parts (solids content: 10 parts) of the macromonomer solution (MM-3) obtained in Production Example 3, 20 parts of ethylene glycol monobutyl ether, and 30 parts of diethylene glycol monoethylether acetate were placed into a reaction vessel equipped with a thermometer, a thermostat, a stirrer, a reflux condenser, a nitrogen gas inlet tube, and two dropping funnels. The resulting mixture was heated to 85° C. while nitrogen gas was blown into the liquid. Subsequently, the following mixtures were simultaneously added dropwise over a period of 4 hours to the reaction vessel maintained at the same temperature: a mixture comprising 14.4 parts of N,N-dimethylacrylamide, 75.6 parts of N-isopropylacrylamide, 10 parts of ethylene glycol monobutyl ether, and 40 parts of diethylene glycol monoethyl ether acetate; and a mixture comprising 0.2 parts of 2,2'-azobis(2-methylbutyronitrile) and 20 parts of ethylene glycol monobutyl ether. After completion of the dropwise addition, the mixture was stirred at the same temperature for 2 hours and aged. Thereafter, a mixture comprising 0.3 parts of 2,2'-azobis(2,4-dimethylvaleronitrile) and 15 parts of ethylene glycol monobutyl ether was added dropwise to the reaction vessel maintained at the same temperature over a period of 1 hour. After completion of the dropwise addition, the mixture was stirred at the same temperature for 1 hour and aged. Thereafter, the resulting mixture was cooled to 30° C. while ethylene glycol monobutyl ether was added thereto, thereby obtaining a graft copolymer solution with a solids content of 35%. The obtained graft copolymer had a weight average molecular weight of $23 \times 10^4$. Deionized water was added to the obtained copolymer solution to obtain a graft copolymer dilute solution (GP-1) with a solids content of 20%.

Production Examples 16 to 26

Graft copolymer dilute solutions (GP-2) to (GP-12) with a solids content of 20% were obtained as in Production Example 15, except that the monomer compositions shown in Table 3 below were used. Table 3 shows the lower critical solution temperature $T_1$ of the main chain of each of the obtained graft polymers. Table 3 also shows the weight average molecular weights.

TABLE 2

| | | Production Example | | | | | | | | | |
|---|---|---|---|---|---|---|---|---|---|---|---|
| | | 5 | 6 | 7 | 8 | 9 | 10 | 11 | 12 | 13 | 14 |
| Name of Copolymer | | P-1 | P-2 | P-3 | P-4 | P-5 | P-6 | P-7 | P-8 | P-9 | P-10 |
| N-substituted (meta)acrylamide derivative | N,N-Dimethylacrylamide | 16 | 39 | 10 | 21 | 50 | 28 | 60 | 19 | 30 | 77 |
| | N-Isopropylacrylamide | 84 | 31 | 60 | 49 | 50 | 42 | 40 | 51 | 40 | |
| | Hydroxyethyl acrylamide | | | | 30 | | | | 30 | | |
| Other monomers | 2-Hydroxyethyl acrylate | | 30 | 30 | | 30 | | | 30 | | |
| | n-Butyl acrylate | | | | | | | | | | 23 |
| Lower Critical Solution Temperature (° C.) | | 34 | 79 | 45 | 94 | 55 | 61 | 71 | 88 | 65 | 27 |

TABLE 3

| | | Production Example | | | | | | | | | | | |
|---|---|---|---|---|---|---|---|---|---|---|---|---|
| | | 15 | 16 | 17 | 18 | 19 | 20 | 21 | 22 | 23 | 24 | 25 | 26 |
| Name of Graft Copolymer | | GP-1 | GP-2 | GP-3 | GP-4 | GP-5 | GP-6 | GP-7 | GP-8 | GP-9 | GP-10 | GP-11 | GP-12 |
| Macromonomer | Macromonomer solution (MM-1) | | | | 15.4 | | | | | | | | |
| | Macromonomer solution (MM-2) | | | | | | | | | | 15.4 | | |
| | Macromonomer solution (MM-3) | 15.4 | 15.4 | 15.4 | | 15.4 | 15.4 | 15.4 | 15.4 | 15.4 | | 15.4 | |
| | Macromonomer solution (MM-4) | | | | | | | | | | | | 15.4 |
| N-substituted (meta)acrylamide derivative | N,N-Dimethylacrylamide | 14.4 | 35.1 | 9 | 25.2 | 18.9 | 45 | 25.2 | 54 | 17.1 | 27 | 69.3 | 54 |
| | N-Isopropylacrylamide | 75.6 | 27.9 | 54 | 37.8 | 44.1 | 45 | 37.8 | 36 | 45.9 | 36 | | 36 |
| | Hydroxyethyl acrylamide | | | | | 27 | | | | 27 | | | |
| Other monomers | 2-Hydroxyethyl acrylate | | 27 | 27 | 27 | | | 27 | | | 27 | | |
| | n-Butyl acrylate | | | | | | | | | | | 20.7 | |
| Polymerisation Initiator | 2,2'-Azobis(2-methylbutyronitrile) | 0.2 | 0.2 | 0.2 | 0.2 | 0.2 | 0.2 | 0.2 | 0.2 | 0.2 | 0.2 | 0.2 | 0.2 |
| | 2,2'-Azobis(2,4-dimethylvaleronitrile) | 0.3 | 0.3 | 0.3 | 0.3 | 0.3 | 0.3 | 0.3 | 0.3 | 0.3 | 0.3 | 0.3 | 0.3 |
| Lower Critical Solution Temperature $T_1$ (° C.) of Main Chain | | 34 | 79 | 45 | 61 | 94 | 55 | 61 | 71 | 88 | 65 | 27 | 71 |
| Weight Average Molecular Weight | | $23 \times 10^4$ | $23 \times 10^4$ | $23 \times 10^4$ | $23 \times 10^4$ | $23 \times 10^4$ | $23 \times 10^4$ | $23 \times 10^4$ | $23 \times 10^4$ | $23 \times 10^4$ | $23 \times 10^4$ | $23 \times 10^4$ | $23 \times 10^4$ |

Production of Hydroxy-Containing Acrylic Resin

Production Example 27

128 parts of deionised water and 3 parts of Adeka Reasoap SR-1025 (trade name, produced by ADEKA; emulsifier; active ingredient 25%) were placed into a reaction vessel equipped with a thermometer, a thermostat, a stirrer, a reflux condenser, a nitrogen gas inlet tube, and a dropping funnel. The mixture was stirred and mixed under a nitrogen stream and heated to 80° C.

Subsequently, 1% of the entire amount of the below-described monomer emulsion for the core portion and 5.3 parts of a 6% ammonium persulfate aqueous solution were introduced into the reaction vessel, and maintained at 80° C. for 15 minutes. Thereafter, the remaining monomer emulsion for the core portion was added dropwise to the reaction vessel maintained at the same temperature over a period of 3 hours. After completion of the dropwise addition, the mixture was aged for 1 hour. Subsequently, the below-described monomer emulsion for the shell portion was added dropwise to the reaction vessel over a period of 1 hour, followed by aging for 1 hour. Thereafter, the mixture was cooled to 30° C. while 40 parts of a 5% aqueous 2-(dimethylamino)ethanol solution was gradually added thereto, thereby obtaining a hydroxy-containing acrylic resin aqueous dispersion (AC-1) having an average particle diameter of 100 nm, and a solids content of 30%. The obtained hydroxy-containing acrylic resin had an acid value of 26 mg KOH/g and a hydroxy value of 22 mg KOH/g.

Monomer emulsion for core portion: 40 parts of deionised water, 2.8 parts of Adeka Reasoap SR-1025, 2.1 parts of allyl methacrylate, 2.8 parts of styrene, 28 parts of n-butyl acrylate, 16.1 parts of methyl methacrylate, and 21 parts of ethyl acrylate were mixed and stirred, thereby obtaining a monomer emulsion for the core portion.

Monomer emulsion for shell portion: 17 parts of deionized water, 1.2 parts of Adeka Reasoap SR-1025, 0.03 parts of ammonium persulfate, 3 parts of styrene, 9 parts of n-butyl acrylate, 5.1 parts of 2-hydroxyethyl acrylate, 4 parts of methacrylic acid, 6 parts of methyl methacrylate, and 2.9 parts of ethyl acrylate were mixed and stirred, thereby obtaining a monomer emulsion for the shell portion.

Production Example 28

35 parts of propylene glycol monopropyl ether was placed into a reaction vessel equipped with a thermometer, a thermostat, a stirrer, a reflux condenser, a nitrogen gas inlet tube, and a dropping funnel, and heated to 85° C. Thereafter, a mixture comprising 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2'-azobis(2,4-dimethylvaleronitrile) was added thereto dropwise over a period of 4 hours. After completion of the dropwise addition, the resulting mixture was aged for 1 hour. A mixture comprising 10 parts of propylene glycol monopropyl ether and 1 part of 2,2'-azobis(2,4-dimethylvaleronitrile) was further added thereto dropwise over a period of 1 hour. After completion of the dropwise addition, the resulting mixture was aged for 1 hour. Then, 7.4 parts of diethanolamines was further added thereto to obtain a hydroxy-containing acrylic resin solution (AC-2) with a solids content of 55%. The obtained hydroxy-containing acrylic resin had an acid value of 47 mg KOH/g and a hydroxy value of 72 mg KOH/g.

Production of Hydroxy-Containing Polyester Resin

Production Example 29

109 parts of trimethylolpropane, 141 parts of 1,6-hexanediol, 126 parts of 1,2-cyclohexanedicarboxylic acid anhydride, and 120 parts of adipic acid were placed into a reaction vessel equipped with a thermometer, a thermostat, a stirrer, a reflux condenser, a nitrogen gas inlet tube, and a water separator. The mixture was heated from 160° C. to 230° C. over a period of 3 hours, followed by a condensation reaction at 230° C. for 4 hours. Subsequently, in order to add carboxyl groups to the obtained condensation reaction product, 38.3 parts of trimellitic anhydride was further added thereto and the resulting mixture was reacted at 170° C. for 30 minutes. Thereafter, the reaction product was diluted with 2-ethyl-1-hexanol to obtain a hydroxy-containing polyester resin solution (PE-1) with a solids content of 70%. The obtained hydroxy-containing polyester resin had an acid value of 46 mg KOH/g, a hydroxy value of 150 mg KOH/g, and a number average molecular weight of 1,400.

Production of Aluminum Pigment Dispersion

Production Example 30

In a stirring vessel, 19 parts (solids content: 14 parts) of GX-180A (trade name, produced by Asahi Kasei Metals, Ltd.; aluminum pigment paste, aluminum content: 74%), 35 parts of 2-ethyl-1-hexanol, 8 parts (solids content: 4 parts) of the phosphoric acid group-containing resin solution described below, and 0.2 parts of 2-(dimethylamino)ethanol were uniformly mixed to obtain an aluminum pigment dispersion (AL-1).

Phosphoric acid group-containing resin solution: a solvent mixture comprising 27.5 parts of methoxypropanol and 27.5 parts of isobutanol was placed into a reaction vessel equipped with a thermometer, a thermostat, a stirrer, a reflux condenser, a nitrogen gas inlet tube, and a dropping funnel, and the solvent mixture was heated to 110° C. Subsequently, 121.5 parts of a mixture comprising 25 parts of styrene, 27.5 parts of n-butyl methacrylate, 20 parts of "Isostearyl Acrylate" (trade name, produced by Osaka Organic Chemical Industry, Ltd., branched higher alkyl acrylate), 7.5 parts of 4-hydroxybutyl acrylate, 15 parts of the phosphoric acid group-containing polymerizable monomer described below, 12.5 parts of 2-methacryloyloxy ethyl acid phosphate, 10 parts of isobutanol, and 4 parts of t-butyl peroxyoctanoate was added to the solvent mixture over a period of 4 hours. Further, a mixture comprising 0.5 parts of t-butyl peroxyoctanoate and 20 parts of isopropanol was added dropwise thereto for 1 hour. The resulting mixture was then stirred and aged for 1 hour to obtain a phosphoric acid group-containing resin solution having a solids content concentration of 50%. The phosphoric acid group-containing resin had an acid value of 83 mg KOH/g, a hydroxy value of 29 mg KOH/g, and a weight average molecular weight of 10,000.

Phosphoric acid group-containing polymerizable monomer: 57.5 parts of monobutyl phosphate and 41 parts of isobutanol were placed into a reaction vessel equipped with a thermometer, a thermostat, a stirrer, a reflux condenser, a nitrogen gas inlet tube, and a dropping funnel. After the mixture was heated to 90° C., 42.5 parts of glycidyl methacrylate was added dropwise thereinto over a period of 2 hours, and further stirred for 1 hour and aged. Subsequently, 59 parts of isopropanol was added thereto to obtain a phosphoric acid group-containing polymerizable monomer solution having a solids content concentration of 50%. The obtained monomer had an acid value of 285 mg KOH/g.

Production of Aqueous Coating Composition

Production Example 31

100 parts (solids content: 30 parts) of the hydroxy-containing acrylic resin aqueous dispersion (AC-1) obtained in Production Example 27, 18 parts (solids content: 10 parts) of the hydroxy-containing acrylic resin solution (AC-2) obtained in Production Example 28, 43 parts (solids content: 30 parts) of the hydroxy-containing polyester resin solution (PE-1) obtained in Production Example 29, 62 parts of the aluminum pigment dispersion (AL-1) obtained in Production Example 30, and 37.5 parts of Cymel 325 (trade name, produced by Japanese Psytec Industries, Inc., melamine resin, solids content: 80%) were placed into a stirring vessel, and the mixture was uniformly mixed. Then, 5 parts (solids content: 1 part) of the graft copolymer dilute solution (GP-1) obtained in Example 15, 2-(dimethylamino)ethanol, and deionized water were further added thereto to obtain an aqueous coating composition (X-1) having a pH of 8.0 and a solids content of 25%.

Production Examples 32 to 42

Aqueous coating compositions (X-2) to (X-12) having a pH of 8.0 and a solids content of 25% were obtained as in Example 31, except that graft copolymer dilute solutions shown in Table 4 below were used in place of the graft copolymer dilute solution (GP-1).

Production of Substrate

Production Example 43

A thermosetting epoxy resin cationic electrodeposition coating composition (trade name "Electron GT-10", produced by Kansai Paint Co., Ltd.) was applied by electrodeposition to a zinc phosphate-treated cold-rolled steel plate (30 cm×45 cm) to a film thickness of 20 μm, and cured by heating at 170° C. for 30 minutes. Subsequently, an intermediate coating composition (trade name "TP-65-2", produced by Kansai Paint Co., Ltd., a polyester resin/amino resin organic solvent-type coating composition) was applied to this electrodeposition coating film to a film thickness of 35 μm, and cured by heating at 140° C. for 30 minutes. Thereby, a substrate comprising a steel plate, and an electrodeposition coating film and an intermediate coating film formed on the steel plate was prepared.

Method of Forming Coating Films

Example 1

The aqueous coating composition (X-1) obtained in Production Example 31 was used as a coating composition for forming a base coating film in the 2-coat 1-bake method ((1) graft copolymer-containing aqueous coating composition application step; (2) preheating step; (3) clear coating film forming step; and (4) heat curing step) of Method 1 above. Thereby, a multilayer coating film comprising a base coating film and a clear coating film was formed on a substrate.

Specifically, the aqueous coating composition (X-1) was applied to the substrate obtained in Production Example 43 to a film thickness of 15 μm using a rotary atomization-type bell-shaped coating device, allowed to stand for 2 minutes, and preheated at 60° C. for 3 minutes. Subsequently, an acrylic resin organic solvent-based top clear coating composition (trade name "Magicron KINO-1210", produced by Kansai Paint Co., Ltd.) was applied to the uncured coated surface to a film thickness of 35 μm, allowed to stand for 7 minutes, and heated at 140° C. for 30 minutes to simultaneously cure both coating films. Thereby, a test panel consisting of a substrate having a multilayer coating film comprising a base coating film and a clear coating film formed on the substrate was obtained.

Examples 2 to 13 and Comparative Examples 1 to 6

The test panels of Examples 2 to 13 and Comparative Examples 1 to 6 were obtained as in Example 1, except that the aqueous coating compositions shown in Table 4 were used in place of the aqueous coating composition (X-1), and that the preheating temperature $T_2$ was adjusted as shown in Table 4.

Evaluation Test

Each test panel obtained in Examples 1 to 13 and Comparative Examples 1 to 6 was evaluated for smoothness, distinctness of image (DOI), flip-flop property, and metallic mottling. The test methods are as follows.

Smoothness: Smoothness was evaluated for each test panel based on the Long Wave (LW) values measured by "Wave Scan" (product name, produced by BYK-Gardner). The lower the LW value, the higher the smoothness of the coated surface.

DOI: DOI was evaluated for each test panel based on the Short Wave (SW) values measured by "Wave Scan" (product name, produced by BYK-Gardner). The lower the SW value, the higher DOI on the coated surface.

Flip-flop property: Each test panel was observed visually from various angles, and the flip-flop property was evaluated according to the following criteria.
S: Variation of the brightness depending on the angle of viewing is significantly high (extremely excellent flip-flop property).
A: Variation of the brightness depending on the angle of viewing is high (excellent flip-flop property).
B: Variation of the brightness depending on the angle of viewing is slightly low (slightly poor flip-flop property).
C: Variation of the brightness depending on the angle of viewing is low (poor flip-flop property).

Metallic mottling: Each test panel was visually observed, and the degree of metallic mottling occurrence was evaluated according to the following criteria:
S: Substantially no metallic mottling was observed, and the coating film has an extremely excellent appearance.
A: A small amount of metallic mottling was observed, but the coated film has an excellent appearance.
B: Metallic mottling was observed, and the coating film has a slightly poor appearance.
C: A considerable amount of metallic mottling was observed, and the coating film has a poor appearance.

Comprehensive Evaluation

In the field of the present invention, i.e., in the field of coating automobile bodies, etc., it is important that the coating film be excellent in all of the conditions of smoothness, DOI, and luster. Therefore, a comprehensive evaluation was conducted according to the following criteria;
S: Smoothness and DOI are 15 or lower, flip-flop property is S, and metallic mottling is S.
A: Smoothness and DOI are 15 or lower, flip-flop property and metallic mottling are S or A, with at least one of the flip-flop property or metallic mottling being A.
B: Smoothness and DOI are 20 or lower, and flip-flop property and metallic mottling are S, A, or B, with at least one of the smoothness or DOI being greater than 15 or at least one of the flip-flop property or metallic mottling being B.
C: At least one of the smoothness or DOI is greater than 20, or at least one of the flip-flop property or metallic mottling is C. Table 4 shows the test results of the coating film performance.

TABLE 4

|  | Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Aqueous coating composition | X-1 | X-2 | X-3 | X-4 | X-5 | X-6 | X-7 | X-8 | X-2 | X-9 |
| Graft copolymer dilute solution | GP-1 | GP-2 | GP-3 | GP-4 | GP-5 | GP-6 | GP-7 | GP-8 | GP-2 | GP-9 |
| Lower Critical Solution Temperature $T_1$ (° C.) of Main Chain | 34 | 79 | 45 | 61 | 94 | 55 | 61 | 71 | 79 | 88 |
| Preheating temperature $T_2$ (° C.) | 60 | 60 | 70 | 70 | 70 | 80 | 80 | 80 | 80 | 80 |
| $T_2 - T_1$ (° C.) | 26 | −19 | 25 | 9 | −24 | 25 | 19 | 9 | 1 | −8 |
| Smoothness: LW | 11 | 12 | 11 | 11 | 12 | 11 | 11 | 11 | 10 | 11 |
| DOI: SW | 11 | 10 | 12 | 11 | 12 | 12 | 11 | 10 | 10 | 10 |
| Flip-flop property | S | S | S | S | S | S | S | S | S | S |
| Metallic mottling | A | A | S | S | S | S | S | S | S | S |
| Comprehensive evaluation | A | A | S | S | S | S | S | S | S | S |

|  | Example | | | Comparative Example | | | | | |
| --- | --- | --- | --- | --- | --- | --- | --- | --- | --- |
|  | 11 | 12 | 13 | 1 | 2 | 3 | 4 | 5 | 6 |
| Aqueous coating composition | X-5 | X-9 | X-10 | X-11 | X-1 | X-3 | X-6 | X-9 | X-12 |
| Graft copolymer dilute solution | GP-5 | GP-9 | GP-10 | GP-11 | GP-1 | GP-3 | GP-6 | GP-9 | GP-12 |
| Lower Critical Solution Temperature $T_1$ (° C.) of Main Chain | 94 | 88 | 65 | 27 | 34 | 45 | 55 | 88 | 71 |
| Preheating temperature $T_2$ (° C.) | 80 | 90 | 90 | 60 | 70 | 80 | 90 | 55 | 80 |
| $T_2 - T_1$ (° C.) | −14 | 2 | 25 | 33 | 36 | 35 | 35 | −33 | 9 |
| Smoothness: LW | 11 | 9 | 10 | 26 | 22 | 20 | 21 | 28 | 29 |
| DOI: SW | 11 | 10 | 11 | 27 | 25 | 23 | 22 | 30 | 31 |
| Flip-flop property | S | S | S | C | C | C | C | C | C |
| Metallic mottling | S | S | S | C | C | C | C | C | C |
| Comprehensive evaluation | S | S | S | C | C | C | C | C | C |

The invention claimed is:

1. A method for forming a coating film comprising:
Step (1): forming an uncured coating film by applying to a substrate an aqueous coating composition that contains a copolymer of monomer components comprising one or more N-substituted (meth)acrylamide compounds, the copolymer being a graft copolymer comprising (A) a main chain having a lower critical solution temperature $T_1$ in water within the range of 30 to 95° C., and (B) at least one hydrophobic side chain;
Step (2): preheating the uncured coating film formed in Step (1) under heating conditions such that a preheating temperature $T_2$ falls within the range of 60 to 100° C., and the preheating temperature $T_2$ and the lower critical solution temperature $T_1$ have a relationship represented by the formula $T_2-T_1=-30$ to 30° C.; and
Step (3): curing the uncured coating film formed in Step (2) by heating.

2. The method for forming a coating film according to claim 1, which further comprises Step (2') between Step (2) and Step (3):

Step (2'): applying a clear coating composition to the uncured base coating film formed in Step (2) to form a clear coating film,
the uncured base coating film and uncured clear coating film respectively formed in Steps (2) and (2') being simultaneously cured by heating in Step (3).

3. The method for forming a coating film according to claim 1, wherein the graft copolymer is a copolymer obtained by radical copolymerization of an unsaturated monomer mixture containing said one or more N-substituted (meth)acrylamide compound and a hydrophobic macromonomer.

4. The method for forming a coating film according to claim 3, wherein the content of the N-substituted (meth)acrylamide compound is 1 to 99 parts by mass and the content of the hydrophobic macromonomer is 1 to 30 parts by mass relative to 100 parts by mass of unsaturated monomer mixture.

5. An article comprising a coating film formed by the method for forming a coating film according to claim 1.

* * * * *